Dec. 24, 1963 F. LEIGHTON ETAL 3,115,069
AUXILIARY SPRING POWERED SAFETY ACTUATOR FOR
BRAKES OF THE FLUID OPERATED TYPE
Filed July 17, 1961
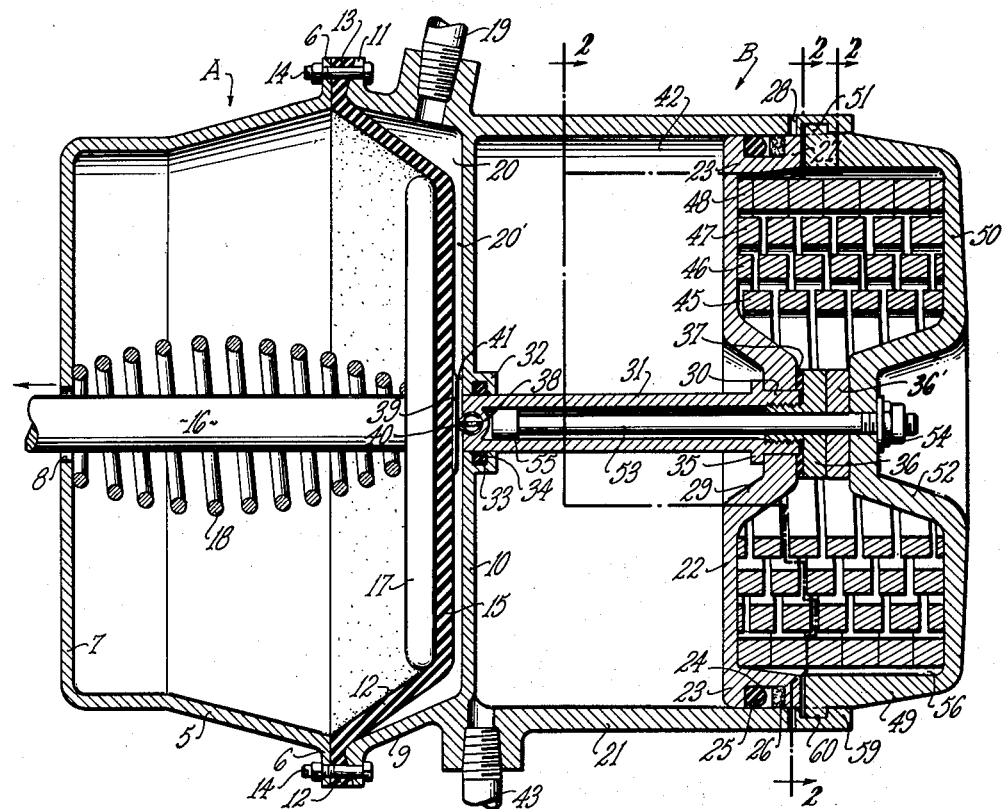
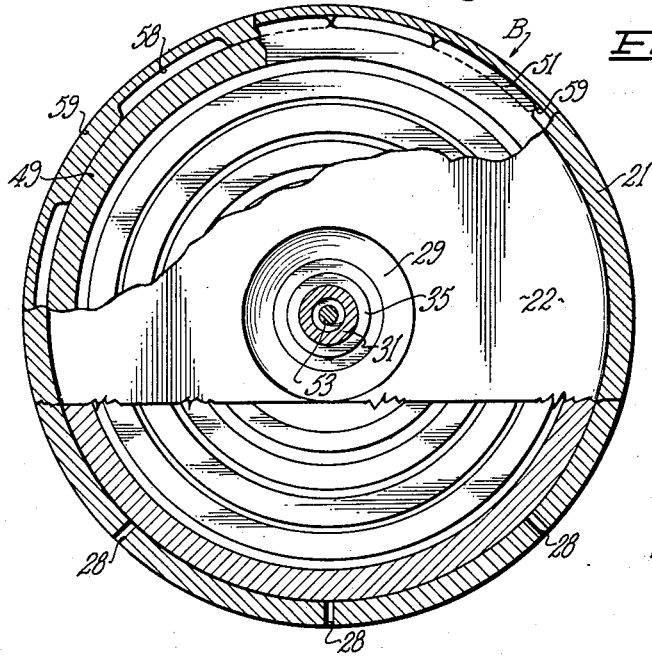
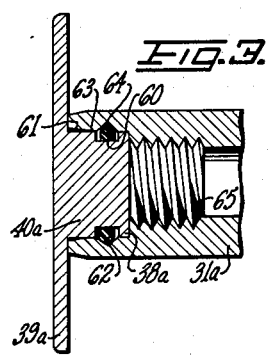
INVENTOR.
FRANCIS LEIGHTON
ALBERT D. HERMAN
BY
Sellers and Latta
ATTORNEY

United States Patent Office

3,115,069
Patented Dec. 24, 1963

3,115,069
AUXILIARY SPRING POWERED SAFETY ACTUATOR FOR BRAKES OF THE FLUID OPERATED TYPE
Francis Leighton and Albert D. Herman, Encino, Calif., assignors to Crane Co., a corporation of Illinois
Filed July 17, 1961, Ser. No. 125,061
9 Claims. (Cl. 92—63)

This application is a continuation-in-part of our patent application S.N. 29,365, filed May 16, 1960, now Patent No. 2,992,630 for auxiliary spring powered safety actuator for brakes of the fluid operated type.

This invention relates generally to brake actuating systems of the fluid operated type and in particular to air brake systems for automotive vehicles such as highway trucks, trailers, tractor-truck combinations etc.

The general object of the invention is to provide a spring-powered auxiliary actuator in operative association with a conventional fluid-powered service brake actuator, adapted to become operative to set the brakes in the event of failure of fluid pressure in the system.

Specifically, the invention contemplates an auxiliary spring-powered service brake actuator unit associated directly with a respective pneumatic actuator for a respective individual wheel brake, in a system wherein the fluid pressure in the service line for the pneumatic actuators is applied to each of the auxiliary actuators in a manner to maintain them inoperative so long as ample fluid pressure for operation of the brakes exists in the system. The auxiliary actuator accordingly embodies a cylinder which is attached directly to the end cap of the service brake actuator and which defines, with the diaphragm thereof, a fluid chamber into which fluid under pressure is injected so as to move the diaphragm in a direction to transmit pressure through a push rod to the brake for actuating the same. The auxiliary actuator also embodies a piston, sliding in its cylinder and having a stem which passes through a sealed aperture in the end cap of the service brake actuator, for transmitting pressure to the diaphragm for auxiliary actuation when pressure fails in the air pressure supply line of the system. The auxiliary pressure is developed by a series of coil springs engaged under compression between the piston and a cap on the rear end of the cylinder.

Actuators of this general type have been hitherto proposed but have not been accepted commercially because of a number of unsatisfactory characteristics therein. The general object of the present invention is to provide improvements in this type of actuator, such as to make it suitable for commercial use.

A further object is to provide an improved arrangement of bleed ports for breathing action within the actuator spring chamber defined between the piston and rear end cap, and for bleeding condensed moisture from the cylinder, the bleed ports being normally sealed by the rim of the piston.

A further object is to provide an improved arrangement of diaphragm cap including a bulkhead dividing the main actuator chamber from the piston retractor chamber, an auxiliary actuator stem passing through the center of the bulkhead, and a pressure pad for applying the pressure of the actuator stem to the center of the diaphragm, wherein there is provided a clearance space to accommodate limited flexing of the bulkhead under the effect of pressure variations in the auxiliary actuator chamber, without affecting the diaphragm; and wherein the pressure pad is detachable from the end of the auxiliary actuator stem to permit the removal of the piston, stem, actuator springs and rear end cap assembly for servicing operations.

Other objects and advantages will become apparent in the ensuing specifications and appended drawing in which:

FIG. 1 is an axial sectional view of a combined fluid actuator and auxiliary spring powered actuator unit embodying our invention;

FIG. 2 is a transverse sectional view thereof taken on the line 2—2 of FIG. 1.

FIG. 3 is a detail sectional view of a modified form of the invention.

*General Description—FIGS. 1 and 2*

Referring now to the drawings in detail, we have shown therein, as an example of one form in which our invention may be embodied, an actuator unit comprising a conventional fluid powered (service brake) actuator indicated generally at A and an auxiliary spring powered actuator unit indicated generally at B.

*Detailed Description—FIGS. 1 and 2*

*Conventional actuator unit.*—The unit A has a main housing section 5 of conventional design, with a peripheral flange 6, and a forward end wall 7 having a central aperture 8; a diaphragm cap including a rim portion 9 and an end wall 10 which constitutes a bulkhead separating the units A and B, and having a peripheral flange 11 opposed to the flange 6; a diaphragm 12 having a peripheral portion 13 clamped between flanges 6 and 11 by bolts 14 and having a flat central portion 15; a brake actuator rod 16 having a flat head 17 bearing against the flat central portion 15 of the diaphragm; a return spring 18 under compression between the forward end wall 7 and the head 17, for returning the diaphragm to the position shown in FIG. 1 in which it is closely adjacent and parallel to bulkhead 10; and a connection 19 to the service line through which air under pressure for normal service operation of the brakes, is injected into the brake operating fluid pressure chamber 20, 20' defined between diaphragm 15 and bulkhead 10.

*Auxiliary actuator unit B.*—Formed integrally with the diaphragm cap 9, 10 is a cylinder 21 in which is slidably mounted an auxiliary actuator piston 22. Piston 22 has a rim 23 provided with a wide cylindrical peripheral recess 24 cooperating with the inner wall of cylinder 21 to define a cylindrical ring chamber in which is mounted an O-ring seal 25 and a lubricating packing ring 26. The rearward flange 27 of rim 23 is normally positioned in covering relation to a series of bleed apertures 28 in the cylinder 21, so as to seal the interior of the cylinder against the entry of dust and other foreign matter.

The piston 22 has a crowned central portion 29 defining an internal recess. Mounted in a flat end wall portion of the crowned central portion 29 is a cylindrical shank 30 of a tubular piston stem 31 which projects forwardly into a cylindrical aperture in a boss 32 which is an integral central portion of bulkhead 10. In boss 32 is an annular internal groove 33 in which is mounted an O-ring seal 34 in constricting sealing engagement with the cylindrical external surface of stem 31. Adjacent the shank 30, stem 31 has an integral flange 35 which abuts the central part of piston 22. A flanged nut 36 is threaded into the shank 30 and is clamped against the outer end face of crowned central piston part 29, with a packing washer 37 interposed.

The forward end of stem 31 is closed by an integral end member having a spherical socket 38. A pressure pad 39, in the form of a thin flat circular disc, is disposed in unattached contact with the rear face of diaphragm 15. Pressure pad 39 is provided on its rear side with a generally spherical array of spring fingers 40 which are engaged in socket 38 with a snap-fastener action which provides a universally pivotal attachment between the forward end of stem 31 and the pressure pad 39. A flat narrow space 41 is defined between the rear surface of pressure pad 39 and the forward face of bulkhead 10, thus accommodating the slight deflections of bulkhead 10 which may take place in response to changes in fluid pressure acting on the bulkhead, and also accommodating self-alignment of pad 39 to the surface of diaphragm 15.

Defined between piston 22 and bulkhead 10 is a retractor chamber 42 which is connected by a suitable fluid connection 43 to the same service line which supplies fluid pressure through connection 19 to the actuator chamber 20. The chamber 42 is sealed by the O-ring 34 against the loss of pressure therefrom. So long as adequate pressure exists in the system, it will be applied in the chamber 42 to the forward side of piston 22, maintaining the piston and stem 31 in the retracted position shown in FIG. 1.

From this retracted position, the piston 22 and stem 31 are adapted to be projected forwardly by the stored energy of a series of coil springs 45, 46, 47 and 48 of progressively greater diameter, disposed in concentric array between the piston 22 and the flat rear end wall 50 of a rear end cap 49 which is secured within the rear end of cylinder by a bayonet coupling comprising circumferentially spaced, radially projecting lugs 51 on the rim of cap 49, adapted to pass axially through notches 58 defined between radially inwardly projecting lugs 59, into an annular recess 60 in the rear end of cylinder 21, and to lock behind the lugs 59 as indicated. Springs 45-48 are contained within a chamber 56 defined between piston 22 and rear end cap 49. Cap 50 has a reentrant central portion 52 in which is mounted the threaded rear end of a tie rod 53 secured by a nut 54 threaded thereon. Tie rod 53 extends through a bore in the nut 36 and into the tubular stem 31 and has at its forward end a head 55 which is slidably fitted to the internal wall of the stem 31.

Modified Form—FIG. 3

FIG. 3 illustrates a modified form of detachable connection between the forward end of piston stem 31a and pressure pad 39a, comprising a solid integral cylindrical coupling shank 40a having an annular peripheral groove 60 near its rear end. Tubular piston stem 31a has, adjacent its forward end, an annular internal V-groove 64 in socket 38a, groove 64 being of approximately 120° angular spread, in cross section, which registers with groove 60 when pad 39a abuts the forward end of stem 31a. Stem 31a also has a conical throat 61 extending from its forward end to the forward extremity of socket 38a, at a low angle (e.g. about 15° or in the range between 10° and 30°). A compressible O-ring 62 of medium soft rubber or synthetic rubber or other equivalent resilient plastic material, provides a releasable coupling connection between the forward end of stem 31a and shank 40a. For inserting and releasing the shank, end pressure (or pull) is applied to the pad 39a, sufficient to cause the O-ring 62 to be flattened into groove 60 until it will pass the annular ridge 63 defined between groove 38a and throat 61, while the shank 40a enters or is withdrawn from the socket 38a.

Stem 31a, just rearwardly of socket 38a, is closed by a plug 65 threaded into a female thread within its tubular bore.

Operation

In the normal operation of the unit, with adequate pressure existing in the system, the operating pressure applied through connection 43 in chamber 42 will retain the piston 22 retracted and the springs 45-48 compressed. In the retracted position, the spring 48 is fully compressed with its adjoining turns in contact with one another and supports the piston 22 in the retracted position, taking the load imposed by the pressure within chamber 42. Additional support, for the center of the piston, may be provided by a spacer washer 36' on tie rod 53 between the head of nut 36 and the re-entrant central section 52 of the rear end cap 50.

In normal service braking operation, air pressure is admitted through connection 19 (under the control of a suitable brake pedal operated valve) into the pneumatic actuator chamber 20 and reacts between the bulkhead 10 and the diaphragm 15 to move the diaphragm forwardly, applying pressure through head 17 to the brake operating rod 16 and projecting it forwardly through the aperture 8 to actuate the brakes. The diaphragm will separate from the pressure pad 39 which will remain supported by the forward end of stem 31. When the pressure on the brake pedal is relieved, the pressure in chamber 20 will be allowed to escape through the connection 19 and return spring 18 will move the actuator rod 16 and diaphragm 15 to their normal position shown in FIG. 1.

The rim portion of diaphragm 12 is contoured to leave a flaring annular space between it and the rim of diaphragm cap 9, this flaring space functioning to rapidly distribute the air from connection 19 to the space 20', of substantial depth, defined between the rear face of diaphragm 15 and bulkhead 10, and thus resulting in quick response of the diaphragm to the pressure fluid injected into the chamber 20.

Chamber 42 is always in communication with the pressure in the service line and so long as the pressure is at a normally high level, the auxiliary actuator will be fully retracted. However, when the pressure in the service line fails, pressure in chamber 42 will correspondingly drop, permitting the piston 22 to advance under the push of springs 45-48. The pad 41, pivotally connected to the forward end of stem 31, will adjust itself automatically to full contact with the diaphragm 15 such as to evenly distribute pressure of the stem 31 to the entire area contacted by the pad. The spring pressure will be transmitted from the stem 31 through the pad 39 to the diaphragm and thus to the head 17 and brake actuator rod 16, actuating the brakes by spring pressure which is sufficiently high to readily overcome the resistance of return spring 18 and to set the brakes.

When moisture condenses in the cylinder 21 (as by the expansion of the spring chamber 56 during an auxiliary spring powered actuation) the bleed ports 28 will be uncovered and upon return movement of piston 22 after the leak in the service line has been repaired and pressure restored, such condensate will be swept rearwardly to the bleed ports 28 and thence through these ports to atmosphere. As the piston 22 assumes its fully retracted position, the ports will again be covered to exclude dust etc. The ports 28 also function to provide a breathing action so that the forward projection of piston 22 under spring power will not be resisted by vacuum in the spring chamber 56.

When it becomes necessary to open up the actuator cylinder by removing the rear end cap 49, the pressure is first bled from the chamber 42 allowing the piston 22 to advance to brake actuating position. At this position, the forward end of nut 36 will engage against the annular shoulder defined by the rear end of head 55 and further spreading movement between the piston 22 and rear end cap 49 will thus be arrested. The parts are adjusted so that the limitation of movement will not interfere with full brake application. The cap 49 can then be rotated to unlock the bayonet coupling, and then removed, without being subjected to shear forces acting between the cap 49 and cylinder 21, since the spring load is now carried by the stem 53 and there is no spring load on cylinder 21. As the cap 49 is uncoupled, completely releasing the attachment between the cap and cylinder 21, the cap will be supported by the stem 53 so as to avoid any rearward projecting of the cap by the action of the still loaded springs. The assembly of cap 49 and piston 22, firmly maintained in coaxial relation with the piston 22 and cap 49 spread apart to their maximum separation, can then be freely moved rearwardly to separate it from the cylinder 21, and any necessary servicing operations can then be performed. When servicing is completed, the assembly of cap, piston and springs, still maintained in coaxial alignment by the spring loaded separation of the cap and piston and the opposing typing action of tie rod 53, can be inserted back into the cylinder 21, the piston guiding the rim of cap 49 into the end of the cylinder, and the lugs 51 can be inserted through notches 58 between the cylinder lugs 59 until the forward end of cap 49 bottoms against the annular shoulder defining the forward side of annular recess 60 in cylinder 21, and by then rotating the cap 49 circumferentially a distance corresponding approximately to the length of one of the lugs 51, the lugs 51 will be locked behind the lugs 59 of the cylinder to secure the cap in place.

The ease with which the apparatus can be disassembled and reassembled in servicing operations is one of the important advantages of the invention. Another important advantage is the valve action which is provided by the cooperative arrangement of seal ring 26 and bleed apertures 28, whereby the following important results are attained: (a) as the piston moves forwardly during an emergency operation, the ports 28 are uncovered and provide a breathing action to allow the coil springs 45–48 to freely act without being opposed by suction in the spring chamber 56; (b) as the piston returns to its retracted position following an emergency operation, it sweeps ahead of it any collected condensate, etc. for dissipation to atmosphere through bleed apertures 28; and (c) when the piston arrives at its fully retracted position, the rear flange 27 of piston 22 seals off the bleed apertures 28 and packing ring 26 effectively seals the cylinder 21.

We claim:

1. An auxiliary spring-powered emergency actuator for a pneumatic brake actuator of the type comprising a diaphragm clamped between a housing and an end cap, and defining with said end cap a diaphragm-actuator chamber, a brake-actuator push rod extending through a central aperture in the housing and having a head bearing against said diaphragm, said auxiliary actuator comprising: a cylinder integral with said end cap and projecting rearwardly therefrom in coaxial, opposed relation to said housing; a piston slidable in said cylinder; a bulkhead, constituted by the central portion of said end cap, cooperating with said piston and cylinder to define a piston-retracting pressure chamber and separating the latter from said diaphragm actuator chamber, said bulkhead having means defining a central aperture; a piston stem having a rear end secured to said piston and a forward end projecting into said aperture and provided with a socket; a pressure pad of thin flat disc form interposed between the central areas of said bulkhead and said diaphragm and having a central coupling element projecting axially from its rear side, engaged in said socket for limited self-aligning pivotal movement and separably coupling said pressure pad to said forward end of the piston stem, for contact-equalizing pressure-transmitting contact with the center of said diaphragm; a rear end cap secured to the rear end of said cylinder in opposed relation to said piston; compression spring means engaged under compression between said piston and said rear end cap; and means for admitting to said piston retracting pressure chamber, the air pressure utilized in actuating said diaphragm, for moving said piston to a retracted position in which said spring means is compressed.

2. An auxiliary spring powered actuator for a pneumatic brake actuator of the type comprising a diaphragm clamped between a housing and an end cap and defining with said cap a diaphragm-actuator chamber, and a brake-actuator push rod extending through a central aperture in the housing and having a head bearing against said diaphragm, said auxiliary actuator comprising: a cylinder secured to said end cap and projecting rearwardly therefrom in coaxial, opposed relation to said housing; a piston slidable in said cylinder; a bulkhead, constituted by the central portion of said end cap, cooperating with said piston and cylinder to define a piston-retracting pressure chamber, said bulkhead separating said chambers and having a central portion defining a central aperture; a rear end cap detachably secured to the rear end of said cylinder in opposed relation to said piston; compression spring means engaged under compression between said piston and said rear end cap; means for admitting to said piston retracting pressure chamber, the air pressure utilized in actuating said diaphragm, for moving said piston to a retracted position in which said spring means is compressed; a tubular piston stem having a rear end secured to the center of said piston and having a closed forward end projecting into said aperture, said closed forward end being provided with a ball socket; a pressure pad comprising a thin flat disc disposed between said diaphragm and said bulkhead and a ball element secured to the rear side of said disc and yieldingly retained in said socket to provide a separable connection between the forward end of said stem and said pressure pad such that said pressure pad may engage said diaphragm with a contact-equalizing engagement and may be separated from said stem to permit removal of said piston and stem rearwardly from the cylinder.

3. An auxiliary spring powered actuator for a pneumatic brake actuator of the type comprising a diaphragm clamped between a housing and an end cap and defining with said cap a diaphragm-actuator chamber, and a brake-actuator push rod extending through a central aperture in the housing and having a head bearing against said diaphragm, said auxiliary actuator comprising: a cylinder integral with said end cap and projecting rearwardly therefrom in coaxial, opposed relation to said housing; a piston slidable in said cylinder; a bulkhead, constituted by the central portion of said end cap, cooperating with said piston and cylinder to define a piston retracting pressure chamber, said bulkhead separating said chambers and having a central portion defining a central aperture; a rear end cap secured to the rear end of said cylinder in opposed relation to said piston; compression spring means engaged under compression between said piston and said rear end cap; means for admitting to said piston retracting pressure chamber, the air pressure utilized in actuating said diaphragm, for moving said piston to a retracted position in which said spring means is compressed; a piston stem having a rear end secured to the center of said piston and having a closed forward end projecting into said aperture, said closed forward end being provided with a ball socket; a pressure pad comprising a thin flat disc disposed between said diaphragm and said bulkhead and a compressible resilient male coupling element secured to the rear side of said disc and yieldingly retained in said ball socket to provide a separable universally pivotal connection between the forward end of said stem and said pressure pad whereby said pressure pad may engage said diaphragm with a contact-equalizing engagement and may be separated from said stem to permit removal of said piston and stem rearwardly from the cylinder.

4. An actuator as defined in claim 1, wherein said coupling element comprises an annular array of resilient spring fingers yieldable radially inwardly for coupling and uncoupling said pad with respect to said piston stem.

5. An actuator as defined in claim 1, wherein said pressure pad is spaced forwardly of said bulkhead in the fully retracted position of said piston and stem, so as to be free for contact equalizing pivotal movement.

6. An auxiliary spring-powered actuator for a pneumatic brake actuator of the type utilizing a diaphragm for transmitting pneumatic pressure to a brake, comprising: a cylinder; a piston slidable in said cylinder, said piston having a rim including axially spaced rim flanges defining a piston ring groove between them; a bulkhead closing the forward end of said cylinder and cooperating with said cylinder and piston to define a piston-retracting pressure chamber, said bulkhead having a central portion defining an aperture; a piston stem having a rear end secured to said piston and a forward end extending into said aperture for transmitting pressure to the center of said diaphragm; a rear end cap attached to the rear end of said cylinder; compression spring means engaged between said rear end cap and piston for actuating the piston and stem to transmit brake-operating pressure through the diaphragm in the event of failure of pressure in said piston retracting pressure chamber; and a connection to said cylinder for admitting to said piston-retracting pressure chamber, the air pressure utilized in actuating said diaphragm, for moving said piston to a retracted position in which said spring means is compressed; said cylinder having, adjacent said rear end cap, an annular array of bleed apertures for discharge of foreign matter swept rearwardly by said piston during its retracting movement; said piston being provided with a sealing ring operative to sweep foreign matter rearwardly in said cylinder and having a rear end portion adapted to cover said bleed apertures to provide a valve action sealing said cylinder in the retracted position of said piston.

7. An auxiliary spring-powered emergency actuator for a pneumatic brake actuator of the type comprising a diaphragm clamped between a housing and an end cap, and defining with said end cap a diaphragm-actuator chamber, a brake-actuator push rod extending through a central aperture in the housing and having a head bearing against said diaphragm, said auxiliary actuator comprising: a cylinder integral with said end cap and projecting rearwardly therefrom in coaxial, opposed relation to said housing; a piston slidable in said cylinder; a bulkhead, constituted by the central portion of said end cap, cooperating with said piston and cylinder to define a piston-retracting pressure chamber and separating the latter from said diaphragm actuator chamber, said bulkhead having means defining a central aperture; a piston stem having a rear end secured to said piston and a forward end projecting into said aperture and provided with a socket; a pressure pad of thin flat disc form interposed between the central areas of said bulkhead and said diaphragm and having a central coupling element projecting from its rear side into said socket and separably coupling said pressure pad to said forward end of the piston stem, for transmitting pressure to the center of said diaphragm; said coupling element comprising a cylindrical shank concentric and integral with said pad and having an annular peripheral groove or generally rectangular cross section; and including a radially yieldable resilient toroidal ring disposed in said groove and yieldingly engaged, with a latching effect, in an internal groove of shallow V-section, in the wall of said socket.

8. An auxiliary spring-powered emergency actuator for a pneumatic brake actuator of the type comprising a diaphragm clamped between a housing and an end cap, and defining with said end cap a diaphragm-actuator chamber, a brake-actuator push rod extending through a central aperture in the housing and having a head bearing against said diaphragm, said auxiliary actuator comprising: a cylinder integral with said end cap and projecting rearwardly therefrom in coaxial, oposed relation to said housing; a piston slidable in said cylinder; a bulkhead, constituted by the central portion of said end cap, cooperating with said piston and cylinder to define a piston-retracting pressure chamber and separating the latter from said diaphragm actuator chamber, said bulkhead having means defining a central aperture; a piston stem having a rear end secured to said piston and a forward end projecting into said aperture and provided with a socket; a pressure pad of thin flat disc form interposed between the central areas of said bulkhead and said diaphragm and having a central coupling element projecting from its rear side into said socket and separably coupling said pressure pad to said forward end of the piston stem, for transmitting pressure to the center of said diaphragm; said coupling element comprising a cylindrical shank concentric and integral with said pad and having an annular peripheral groove of generally rectangular cross section; and including a radially yieldable resilient toroidal ring disposed in said groove and yieldingly engaged, with a latching effect, in an internal groove in the wall of said socket.

9. An actuator as defined in claim 7, wherein said toroidal ring is a circumferentially continuous ring of compressible and stretchable material.

References Cited in the file of this patent

UNITED STATES PATENTS

| | | |
|---|---|---|
| 2,311,842 | Larson | Feb. 23, 1943 |
| 2,860,736 | Belsky | Nov. 18, 1958 |
| 3,020,094 | Murty | Feb. 6, 1962 |

UNITED STATES PATENT OFFICE
CERTIFICATE OF CORRECTION

Patent No. 3,115,069                      December 24, 1963

Francis Leighton et al.

It is hereby certified that error appears in the above numbered patent requiring correction and that the said Letters Patent should read as corrected below.

Column 7, line 42, for "groove or" read -- groove of --.

Signed and sealed this 5th day of May 1964.

(SEAL)
Attest:

ERNEST W. SWIDER                  EDWARD J. BRENNER

Attesting Officer                   Commissioner of Patents